Figure 1:
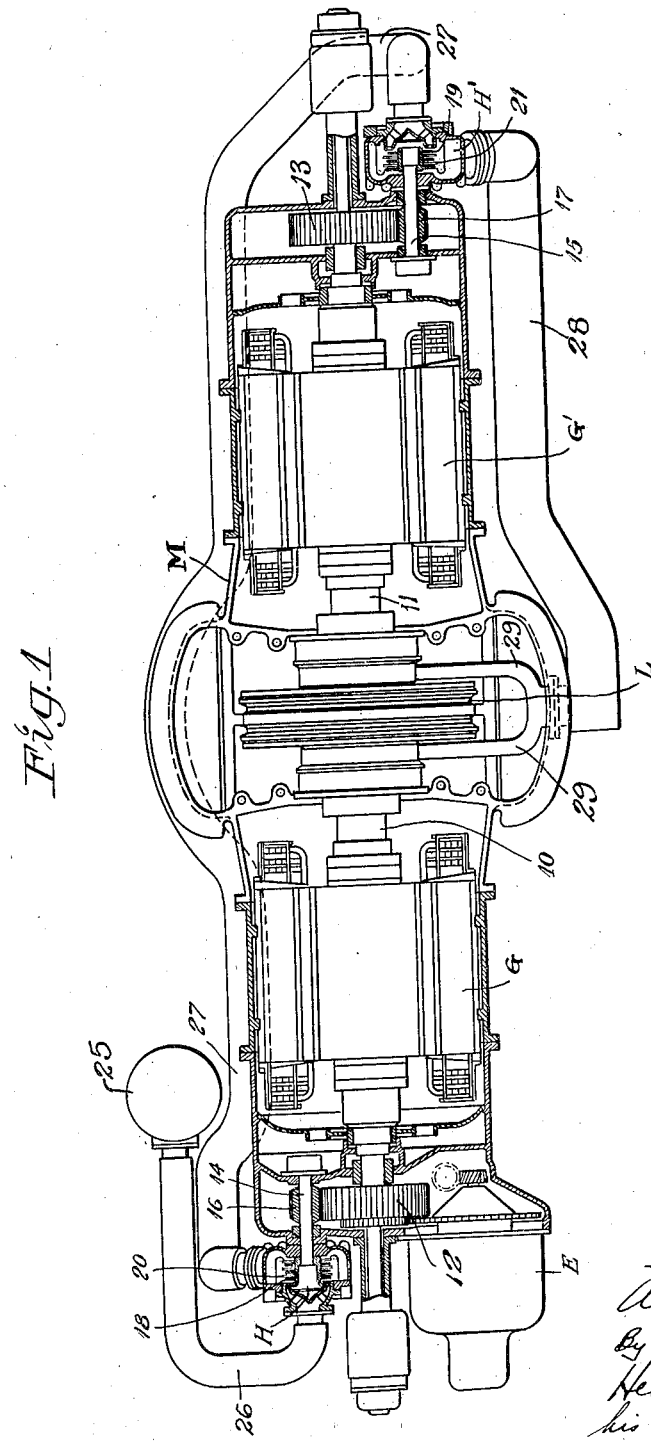

Nov. 22, 1932.　　A. LYSHOLM　　1,888,874
ELASTIC FLUID TURBINE PLANT
Filed Sept. 6, 1927　　2 Sheets-Sheet 1

Inventor:
Alf Lysholm
By
Hedlund & Frucht
his Attorneys

Nov. 22, 1932.  A. LYSHOLM  1,888,874
ELASTIC FLUID TURBINE PLANT
Filed Sept. 6, 1927  2 Sheets-Sheet 2

INVENTOR
Alf Lysholm
BY
his ATTORNEY

Patented Nov. 22, 1932

1,888,874

UNITED STATES PATENT OFFICE

ALF LYSHOLM, OF STOCKHOLM, SWEDEN, ASSIGNOR TO AKTIEBOLAGET LJUNGSTRÖMS ANGTURBIN, OF STOCKHOLM, SWEDEN, A CORPORATION

ELASTIC FLUID TURBINE PLANT

Application filed September 6, 1927, Serial No. 217,663, and in Sweden September 7, 1926.

The present invention relates to elastic fluid turbine plants and has particular reference to turbo electric plants in which the prime mover is divided into a plurality of separate sections operating at different pressures. Still more particularly the invention relates to a turbine plant using as the low pressure section a radial flow turbine of the so-called Ljungström type.

The Ljungström type of radial flow turbine is particularly well adapted for use as a low pressure section since with this type it is possible to handle large volumes of steam with a turbine of small size, and to usefully extract a relatively large quantity of heat from the steam. This type of turbine, however, if it is to be operated efficiently, must be supplied with steam at comparatively low pressure since a high initial pressure results in leakage in the turbine, which materially reduces the efficiency. Furthermore, the radial flow type of turbine requires rather elaborate packing means to prevent steam leakage in the turbine and the use of a low initial pressure is desirable to enable relatively simple packing means to be employed.

Modern power plants utilize steam at high initial pressures, and in order to make use of the radial flow type of turbine some other type of turbine must be employed to reduce the pressure of the steam from its initial pressure to one suitable for use in a radial flow turbine.

It has heretofore been proposed to use an impulse type of axial flow high pressure turbine exhausting to a low pressure radial flow turbine, but this arrangement is not wholly satisfactory for use with high steam pressures because of the inherent limitations of the impulse type of turbine.

In order to secure the desired efficiency of the plant as a whole, it is highly desirable to extract as much heat as is possible from the steam in the high pressure stage or stages ahead of the radial flow turbine. This cannot be done efficiently with an impulse type turbine, since this type of turbine requires high steam velocities and high blade speeds, which in turn involves either extremely high turbine speeds or large diameters of turbine wheels, or both. Consequently, steam cannot be admitted in a turbine of this type around the entire periphery of the turbine wheel, which limits the efficiency obtainable, and the efficiency in such cases is also further adversely affected by high exit velocities of the steam from the turbine blades.

In accordance with the present invention, I improve upon the turbine arrangements heretofore known by dividing the turbine plant into a low pressure section comprising a radial flow turbine of the Ljungström type, and a section of higher pressure comprising one or more turbines which are of the axial flow combined type, that is, of the type in which both impulse and reaction blading is used. By employing a turbine of the combined type ahead of the radial flow turbine, I am enabled to expand high pressure steam to a pressure sufficiently low so that the operation of the radial flow turbine is materially improved. In order to secure the maximum efficiency from the combined turbines forming the section operating at high pressure I prefer to provide such turbines with rotors having at least one impulse wheel and at least three reaction wheels. The use of the one impulse wheel permits an initial reduction in steam pressure in an efficient manner, since the total reduction in pressure through the impulse wheel is relatively small, while the reaction wheels provide the means for efficiently expanding the steam to the degree desired in this section of the apparatus.

In accordance with the invention, the section of higher pressure may consist of a single turbine, but in order to secure the most efficient design both from the standpoint of thermo-dynamics and also from the standpoint of space and mechanical considerations, I prefer to divide the higher pressure section into at least two separate turbines serially connected with respect to flow of motive fluid therethrough and both coupled to the radial flow low pressure section. In cases where the higher pressure section is divided into two separate turbines, these turbines should be designed to give approximately the same power output.

Figure 2:
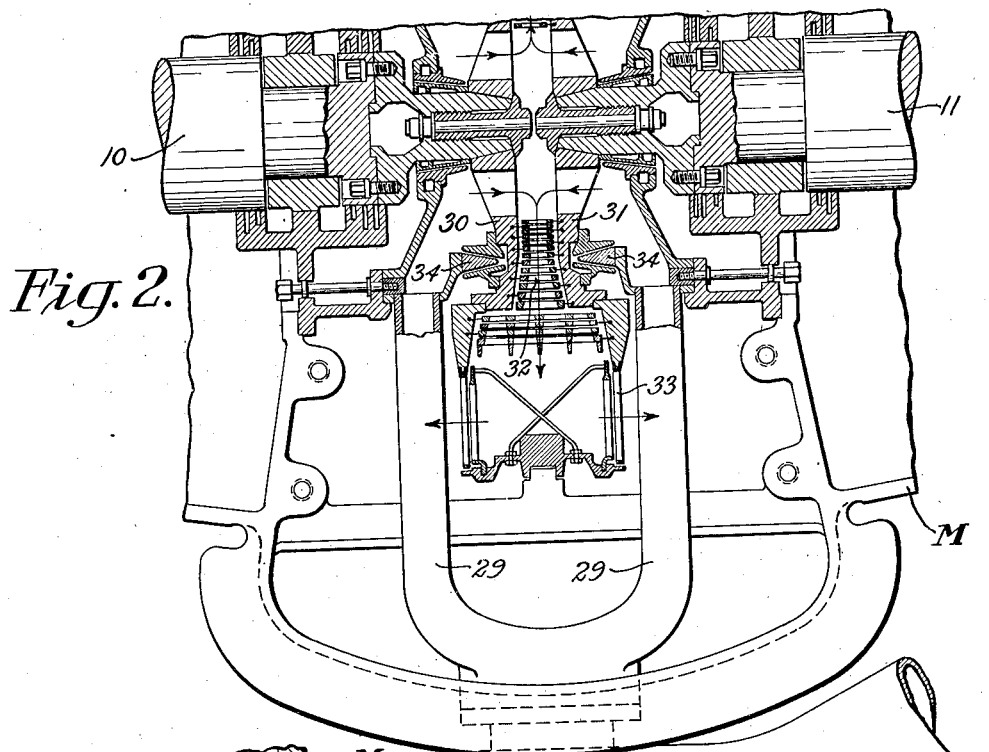
Figure 3:
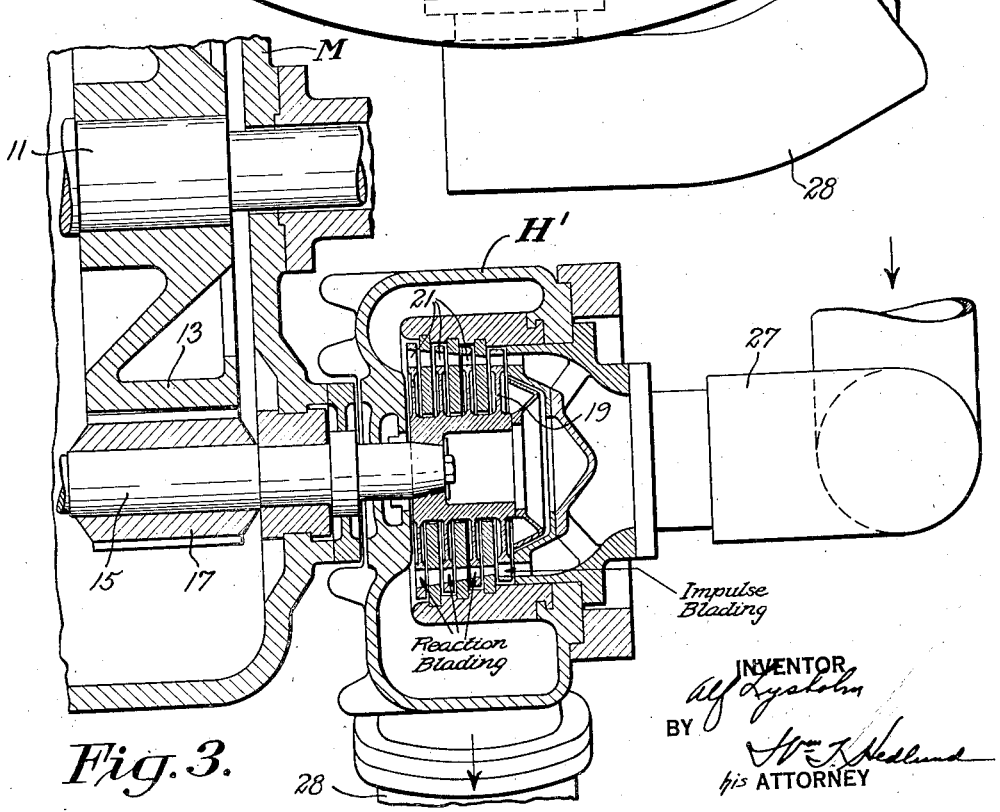

The invention is illustrated by way of example in the following drawings in which Fig. 1 shows an assembly of a turbine plant; Fig. 2 a section on an enlarged scale through a part of the low pressure section of the turbine plant, and Fig. 3 is a section also on an enlarged scale of a turbine unit comprising part of the higher pressure section of the plant.

The low pressure section of the plant consists of a radial flow turbine designated generally at L and comprises two turbine discs 30 and 31 (see Fig. 2) rotating in opposite directions, said discs being secured respectively to shafts 10 and 11. Electric generators G and G' are mounted on shafts 10 and 11 respectively, and outwardly of these generators shafts 10 and 11 are provided with gear wheels 12 and 13 respectively. A casing designated generally by reference character M and built up of a plurality of parts surrounds the unit comprising the plant, and in this casing the shafts 14 and 15 are journalled. Shaft 14 carries a gear 16 meshing with gear 12 and shaft 15 carries a gear 17 meshing with gear 13.

Shafts 14 and 15 are driven respectively by axial turbines H and H'. These turbines, in the embodiment illustrated, comprise the section of higher pressure of the turbine plant and in the specific form shown are of the combined type.

The rotor of turbine H comprises a blade ring 18 of the impulse type and three blade rings 20 of the reaction type. Turbine H' is of similar construction, comprising a rotor having a blade ring 19 of the impulse type and three blade rings 21 of the reaction type.

E designates an electrical machine for the excitation of the generators G and G¹.

The steam enters the turbine plant from the steam supply conduit 25 and passes through the conduit 26 to the inlet of the turbine H, from the outlet of which it flows through the conduit 27 to the inlet of the turbine H¹. From the outlet of the latter turbine the steam flows through the conduit 28 and through the branch conduits 29 to the two turbine disks of the low pressure turbine L.

The steam flows through the low pressure section of the turbine plant first radially and then axially as indicated by the arrows in Fig. 2, and finally passes to the condenser.

In the embodiment shown, the initial pressure of the steam in the different turbines may, for example be 35 kilograms in front of the high pressure part H, 14 kilograms in front of the medium pressure part H¹ and 5 kilograms in front of the low pressure part L, the steam in the high pressure part H then being subjected to a fall of heat of about 50 units of heat per kilogram, whereas in the medium pressure part H¹ the fall of heat likewise amounts to 50 units of heat per kilogram, and in the low pressure part L to about 160 units of heat per kilogram.

Because of the fact that in accordance with the present invention the type of turbine utilized in the section of higher pressure permits of a high pressure drop therein, the radial flow low pressure section may be constructed for a lower initial pressure and consequently the construction of this latter section may be considerably simplified from a mechanical standpoint. As previously stated, the radial flow type of turbine requires rather elaborate packing, usually of the labyrinth type, and with a low initial pressure in this turbine a relatively simple labyrinth packing may be employed and with a relatively simple structure, steam leakage within the turbine, resulting in lowered efficiency thereof, may be reduced to a minimum.

Fig. 2 shows the low pressure section L as comprising the two turbine discs 30 and 31 having inter-meshing blade rings and rotating in opposite directions, said discs being overhung on the shafts 10 and 11, and each containing radial flow blades 32 and axial flow blades 33.

As will be apparent from the drawings it has been possible to simplify the packings between the rotating discs 30 and 31 and the adjacent fixed parts, and in contrast to the previously known forms of construction it has been possible to make the packings, such, for example, as those shown at 34, in the form of stationary rings of conical section between which and the rotating discs there is provided the usual form of relatively simple labyrinth packing. Likewise, it has been possible to simplify other packings and details of construction in the turbine without incurring leakage sufficient to impair the high value of efficiency of the turbine.

What I claim as new and desire to secure by Letters Patent of the United States of America is:—

1. In a turbine plant, in combination, a low pressure section comprising a radial flow turbine including a rotor, a section of higher pressure than the low pressure section comprising an axial flow turbine having a rotor including reaction wheels coupled to the rotor of the radial flow turbine, means to supply elastic fluid to said higher pressure section to expand therein and to exhaust therefrom and means for conducting the expanded fluid to said low pressure section for further expansion in the low pressure section.

2. In a turbine plant, in combination, a low pressure section comprising a radial flow turbine having two shafts adapted to rotate in opposite directions, a section of higher pressure than said low pressure section adapted to receive motive fluid at relatively high pressure and to exhaust it at relatively low pressure comprising two axial flow turbines having reaction wheels, each of said shafts having one of said axial flow turbines connected thereto, means to supply elastic fluid to said higher pressure section to expand therein and to exhaust therefrom, and means for conducting the expanded fluid to said low pressure section for further expansion in the low pressure section.

3. In a turbine plant, in combination, a low pressure section comprising a radial flow turbine having two shafts adapted to rotate in opposite directions, a section of higher pressure than said low pressure section comprising a first axial flow turbine of the type having both an impulse and reaction blading coupled to one of said shafts and a second axial flow turbine of the type having both an impulse and reaction blading coupled to the second of said shafts, means to supply elastic fluid to said higher pressure section to expand therein and to exhaust therefrom, and means for conducting the expanded fluid to said low pressure section for further expansion in the low pressure section.

4. In a turbine plant, in combination, a low pressure section comprising a radial flow turbine having two shafts adapted to rotate in opposite directions and a turbine wheel mounted on the inner end of each of said shafts, a section of higher pressure than said low pressure section comprising a first turbine connected to the outer end of one of said shafts and a second turbine connected to the outer end of the second of said shafts, means for taking power from each of said shafts, means to supply elastic fluid to said higher pressure section to expand therein and to exhaust therefrom, and means for conducting the expanded fluid to said low pressure section for further expansion in the low pressure section.

5. In a turbine plant, in combination, a low pressure section comprising a radial flow turbine having two shafts adapted to rotate in opposite directions and a turbine wheel mounted on the inner end of each of said shafts, a section of higher pressure than said low pressure section comprising a first turbine connected to the outer end of one of said shafts and a second turbine connected to the outer end of the second of said shafts, means for taking power from each of said shafts, and means for connecting said first turbine, said second turbine and said radial flow turbine in series with respect to flow of motive fluid in the order named.

6. In a turbine plant, in combination, a low pressure section comprising a radial flow turbine having two shafts adapted to rotate in opposite directions and a turbine wheel mounted on the inner end of each of said shafts, a section of higher pressure than said low pressure section comprising a first axial flow turbine having reaction wheels connected to the outer end of one of said shafts and a second axial flow turbine having reaction wheels connected to the outer end of the second of said shafts, means for taking power from each of said shafts, means to supply elastic fluid to said higher pressure section to expand therein and to exhaust therefrom, and means for conducting the expanded fluid to said low pressure section for further expansion in the low pressure section.

7. In a turbine plant, in combination, a low pressure section comprising a radial flow turbine having two shafts adapted to rotate in opposite directions and a turbine wheel mounted on the inner end of each of said shafts, a section of higher pressure than said low pressure section comprising a first axial flow turbine of the type having both impulse and reaction blading connected to the outer end of one of said shafts and a second axial flow turbine of the type having both impulse and reaction blading connected to the outer end of the second of said shafts, means for taking power from each of said shafts, means to supply elastic fluid to said higher pressure section to expand therein and to exhaust therefrom, and means for conducting the expanded fluid to said low pressure section for further expansion in the low pressure section.

8. In a turbine plant, in combination, a low pressure section comprising a radial flow turbine having two shafts adapted to rotate in opposite directions, a section of higher pressure than said low pressure section comprising a first axial flow turbine having reaction wheels coupled to one of said shafts and a second axial flow turbine having reaction wheels coupled to the second of said shafts, and means for connecting the first axial flow turbine, the second axial flow turbine and the radial flow turbine in series with respect to flow of motive fluid in the order named.

9. In a turbine plant, in combination, a low pressure section comprising a radial flow turbine having two shafts adapted to rotate in opposite directions, a section of higher pressure than said low pressure section comprising a first axial flow turbine having reaction wheels geared to the first of said shafts and a second axial flow turbine having reaction wheels geared to the second of said shafts, said first and second axial flow turbines being of substantially equal power output, and means for connecting the first axial flow turbine, the second axial flow turbine and the radial flow turbine in series with respect to flow of motive fluid in the order named.

10. In a turbine plant, in combination, a low pressure section comprising a radial flow turbine having two shafts adapted to rotate in opposite directions and a turbine wheel mounted on the inner end of each of said shafts, a section of higher pressure than said low pressure section comprising a first axial flow turbine having reaction wheels geared to the outer end of one of said shafts and a second axial flow turbine having reaction wheels geared to the outer end of the second of said shafts, means for taking power from each of said shafts, and means for connecting the first axial flow turbine, the secood axial flow turbine and the radial flow turbine in series with respect to flow of motive fluid in the order named.

11. In a turbine plant, in combination, a low pressure section comprising a radial flow turbine having two shafts adapted to rotate in opposite directions and a turbine wheel mounted on the inner end of each of said shafts, a section of higher pressure than said low pressure section comprising a first axial flow turbine of the type having both impulse and reaction blading connected to the outer end of one of said shafts and a second axial flow turbine of the type having both impulse and reaction blading connected to the outer end of the second of said shafts, means for taking power from each of said shafts, and means for connecting the first axial flow turbine, the second axial flow turbine and the radial flow turbine in series with respect to the flow of motive fluid in the order named.

In testimony whereof I affix my signature.

ALF LYSHOLM.